United States Patent [19]

Hofmann

[11] Patent Number: 4,508,386

[45] Date of Patent: Apr. 2, 1985

[54] ADJUSTABLE SEAT ASSEMBLY FOR MOTOR VEHICLES

[75] Inventor: Hans-Otto Hofmann, Niederfüllbach, Fed. Rep. of Germany

[73] Assignee: Brose Fahrzeugteile GmbH & Co. Kommanditgesellschaft, Coburg, Fed. Rep. of Germany

[21] Appl. No.: 398,316

[22] Filed: Jul. 15, 1982

[30] Foreign Application Priority Data

Aug. 14, 1981 [DE] Fed. Rep. of Germany ....... 3132235

[51] Int. Cl.³ .............................................. B60N 1/02
[52] U.S. Cl. .................................... 297/346; 248/394; 248/430; 297/330; 297/473
[58] Field of Search ............... 297/322, 330, 345, 346, 297/363–365, 473, 338; 248/393, 394, 396, 407, 429, 430

[56] References Cited

U.S. PATENT DOCUMENTS

| | | | |
|---|---|---|---|
| 2,815,796 | 12/1957 | Lobanoff . | |
| 3,473,844 | 10/1969 | Zinnkann | 297/345 |
| 3,712,573 | 1/1973 | Pickles | 248/394 |
| 3,761,127 | 9/1973 | Giese et al. | 297/346 X |
| 4,225,184 | 9/1980 | Strowick | 248/393 X |
| 4,355,778 | 10/1982 | Hess et al. | 248/429 |

FOREIGN PATENT DOCUMENTS

| | | | |
|---|---|---|---|
| 141839 | 6/1951 | Australia | 248/430 |
| 2416171 | 10/1975 | Fed. Rep. of Germany . | |
| 2856937 | 4/1980 | Fed. Rep. of Germany | 248/393 |
| 699612 | 11/1953 | United Kingdom | 297/346 |

Primary Examiner—William E. Lyddane
Assistant Examiner—Peter R. Brown
Attorney, Agent, or Firm—Toren, McGeady and Stanger

[57] ABSTRACT

A motor vehicle seat assembly including a base portion affixed to the motor vehicle, a seat portion movably attached to the base portion, and a seat adjustment mechanism operatively interposed between the seat portion and the base portion for enabling selective adjustable movement of the seat portion relative to the base portion. In order to enable a passenger's safety belt to be attached at the movable seat portion, a locking pin mechanism is provided which may be selectively activated to lock the seat portion relative to the base portion thereby to prevent relative movement therebetween. The seat adjustment mechanism may be formed with a longitudinal seat adjustment device which enables forward and rearward movement of the seat portion and with tilt adjusting devices enabling height adjustment of the seat. The locking pin mechanism may be arranged to lock at least one or both of the longitudinal seat adjustment mechanism and the tilt adjustment devices.

14 Claims, 15 Drawing Figures

ADJUSTABLE SEAT ASSEMBLY FOR MOTOR VEHICLES

The present invention relates generally to vehicle seat assemblies and more particularly to a vehicle seat assembly having an adjustable vehicle seat. More specifically, the adjustable mechanism of the vehicle seat may comprise a longitudinal adjusting device and/or at least one tilt or height adjusting device for the seat.

In adjustable seat assemblies previously known, the seat assemblies have been actuated by hand or by adjusting motors. In such devices, the seat maintains a respective adjusted position primarily on the basis of a self-locking mechanism of the portion of the adjusting device providing longitudinal movement of the seat or of that portion of the adjusting device providing tilt or height adjustment of the seat.

This type of mechanism is generally sufficient for normal operation. However, during accidents severe forces may occur which are capable of leading to undesirable movement of the seat, for example, when a person with an unfastened seat belt sitting in the rear seat is thrown against the seat back of the front seat during a rear-end collision. In addition, the seat assembly may be severely stressed during accidents if the safety belt provided for the seat is fastened with one or more of its fastening points on the seat portion itself or on the adjustment mechanism for the seat.

This type of belt fastening upon the seat portion of the assembly is desirable because, as a result of this arrangement, the seat belt will always fit the user of the motor vehicle in approximately the same position regardless of the adjusted position of the seat. This may provide considerable increase in the comfort experienced by a passenger as well as security during accidents. Considerable belt forces which can amount to as much as 18,000 N per belt fastening point may be experienced.

Accordingly, it is an object of the present invention to provide an adjustable seat assembly of the type described which exhibits simple design characteristics and reliable functioning while also withstanding great forces, particularly forces developed in the safety belts.

SUMMARY OF THE INVENTION

Briefly, the present invention may be described as a seat assembly particularly for a motor vehicle comprising a base portion affixed to the motor vehicle, a seat portion movably attached to the base portion, seat adjustment means operatively interposed between the seat portion and the base portion for selectively adjustably moving the seat portion relative to the base portion, and locking pin means adapted to be selectively activated to lock the seat portion relative to the base portion to prevent relative movement therebetween.

The seat adjustment means may comprise longitudinal seat adjustment means and tilt adjustment means for effecting, respectively, longitudinal movement and height adjustment of the vehicle seat, with the locking pin means being adapted to be engaged in the locking position to selectively lock at least one of said longitudinal seat adjustment means or said tilt adjustment means.

The assembly may further include means for enabling a passenger safety belt to be connected to the seat portion and, as a result of the present invention, the seat adjustment may be effected without requiring further adjustment of the safety belt while at the same time ensuring proper safety during an accident by operation of the locking pin means.

In accordance with the present invention, the longitudinal adjustment means and/or the tilt and height adjustment means, respectively, will be locked by at least one pin locking mechanism.

The pin locking mechanism may be automatically operated and may be arranged so as to be actuated electromechanically preferably by means of at least one electromagnet. The pin locking mechanism is locked when there is no driving or control voltage present so that full security is ensured during power outage.

In a mechanism wherein adjustment of the seat is effected by means of an adjustment motor, and in order to prevent the adjustment motor from operating when the pin locking mechanism of the invention is in the locked position, a delay circuit is provided which activates the adjustment motor only after unlocking of the pin locking mechanism, with the delay circuit operating to lock the pin locking mechanism only after the adjustment motor has been stopped or is idle.

In a preferred embodiment of the invention, the pin locking mechanism is formed with at least one pin, and at least one pin recess is provided in a part of the longitudinal adjusting or tilt and height adjusting portions of the seat adjustment device, respectively, the part containing the recess being moved relative to the pin locking mechanism with at least one pin of the pin locking mechanism being operable to engage in the pin recess in order to block movement of the seat portion of the assembly. In a situation where a stepwise or gradual adjustment is involved, one pin may be sufficient and the spacing of the pin recesses must then be such as to accommodate the adjustment steps in order to ensure effective engagement with the pin.

In accordance with a further aspect of the invention, when the seat adjustment means operates in a manner which involves continuous adjustable movement of the seat portion, several pins, and preferably two pins, as well as several recesses may be provided in a form wherein the spacing of the pins and of the pin recesses will correspond with each other in such a manner that in every possible adjustment position of the seat portion, at least one of the pins will be in position to engage in at least one of the pin recesses. In most cases it is sufficient to employ two pins which will ensure a simple and sturdy structure for the pin locking mechanism. However, if it is necessary to have the smallest possible pin recesses with the greatest possible spacing therebetween, then more than two pins may be employed. A crosswise offset arrangement of the pins with regard to the direction of adjustment is also possible so that several mutually offset rows of pin recesses may be provided.

With the locking pin mechanism operating to lock the longitudinal adjustment means of the seat adjustment device, when two pins are arranged adjacent one another in the direction of adjustment, the width of the pin recess taken in the direction of adjustment is made equal to the sum of the width of the pin and one third of the distance between the pin axes; the space between adjacent recesses in the middle being equal to two thirds of the distance between the pin axes.

The recesses are preferably provided in a toothed rack of the longitudinal adjustment device. This toothed rack, which is usually provided in adjustable seat assemblies, is made of a high alloy tempered steel and is also sufficiently mechanically stable when formed with the necessary recesses.

In a tilt or height adjusting device in accordance with the present invention, it is contemplated that the recesses be arranged in a part which is swiveled relative to the pin locking mechanism, with the recesses being arranged on several concentric circular arcs corresponding to the number of locking pins provided. In this manner, the recesses may be accommodated in a relatively small circular sector.

Again, no additional part is necessary if the recesses are provided in an arm of a twin armed swiveling lever which is preferably connected so as not to rotate with another twin armed swiveling lever provided with a pinion-driven toothed sector. Two such swiveling levers serve to raise or lower the seat, respectively.

The pin locking mechanism in accordance with the invention may be actuated by means of an electromotor. In the interests of providing a simpler and therefore less expensive construction, the pin locking mechanism is preferably formed with a magnetic armature in a blocking position which is prestressed or pretensioned preferably by means of a spring. The spring may operate to provide a spring pressure which biases the pin locking mechanism into its locking position when the pin locking mechanism is switched off as well as when there is a power failure or loss of electrical power.

When employing several pins, there will occur seat adjustment positions in which only a portion of the pins will lie opposite a corresponding pin recess. In order to simply ensure that the other pins may move out of the way accordingly when the pin locking mechanism is locked, the several pins are supported opposite a common pin carrier optionally fastened on a magnetic armature so that each pin will be displaced in the direction of movement of the pins and so that the several pins will be prestressed in the direction of locking.

This prestressing is preferably provided by a prestressing spring arranged on a bearing sleeve for the pin attached on the pin carrier, with the prestressing spring being supported on one side upon a collar of the pin, the collar having an enlarged diameter, and on the other side on a bearing neck or axle journal on one end of the bearing sleeve.

The invention is particularly directed toward enabling a motor vehicle seat having a seat adjustment mechanism of the type described above to be provided with at least one safety belt fastening point which is located on the seat portion or on a part of the seat adjustment mechanism which is movable relative to the floor of the motor vehicle. The pin locking mechanism of the invention will provide a secure transfer of the seat belt forces to the mounting at the vehicle floor without utilizing adjustment motors and adjustment gear assemblies.

When the tilt or height adjustment device arranged between the longitudinal device and the seat portion is provided, it is preferred that at least one safety belt fastening point be provided on an upper rail of the longitudinal adjustment device, and that the pin locking mechanism be attached on the motor vehicle floor preferably engaging in a toothed rack fastened on the upper rail. The belt forces will therefore be directly conducted from the upper rail through the toothed rack and the pin locking mechanism into the floor portions of the motor vehicle. It does not create a significant problem in such a device that the tilt and height adjusting mechanism of the seat is capable of changing position within relatively narrow limits relative to the upper rail of the longitudinal adjustment mechanism. Such a change in position of the seat results essentially only in a change of the length of the belt which may be easily compensated through a corresponding belt windup mechanism in the seat back.

However, if the longitudinal adjustment device is arranged between the tilt and height adjustment device and the seat, then at least one safety belt fastening point may be attached directly on the seat.

The pin locking mechanism provided on the longitudinal adjusting device as well as the tilt and height adjusting device, respectively, also makes it possible to fasten the shoulder belt on the seat back. If necessary, the joint of the seat back must in such a case be reinforced through corresponding enlargement of the dimensioning of conventional parts.

The various features of novelty which characterize the invention are pointed out with particularity in the claims annexed to and forming a part of this disclosure. For a better understanding of the invention, its operating advantages, and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
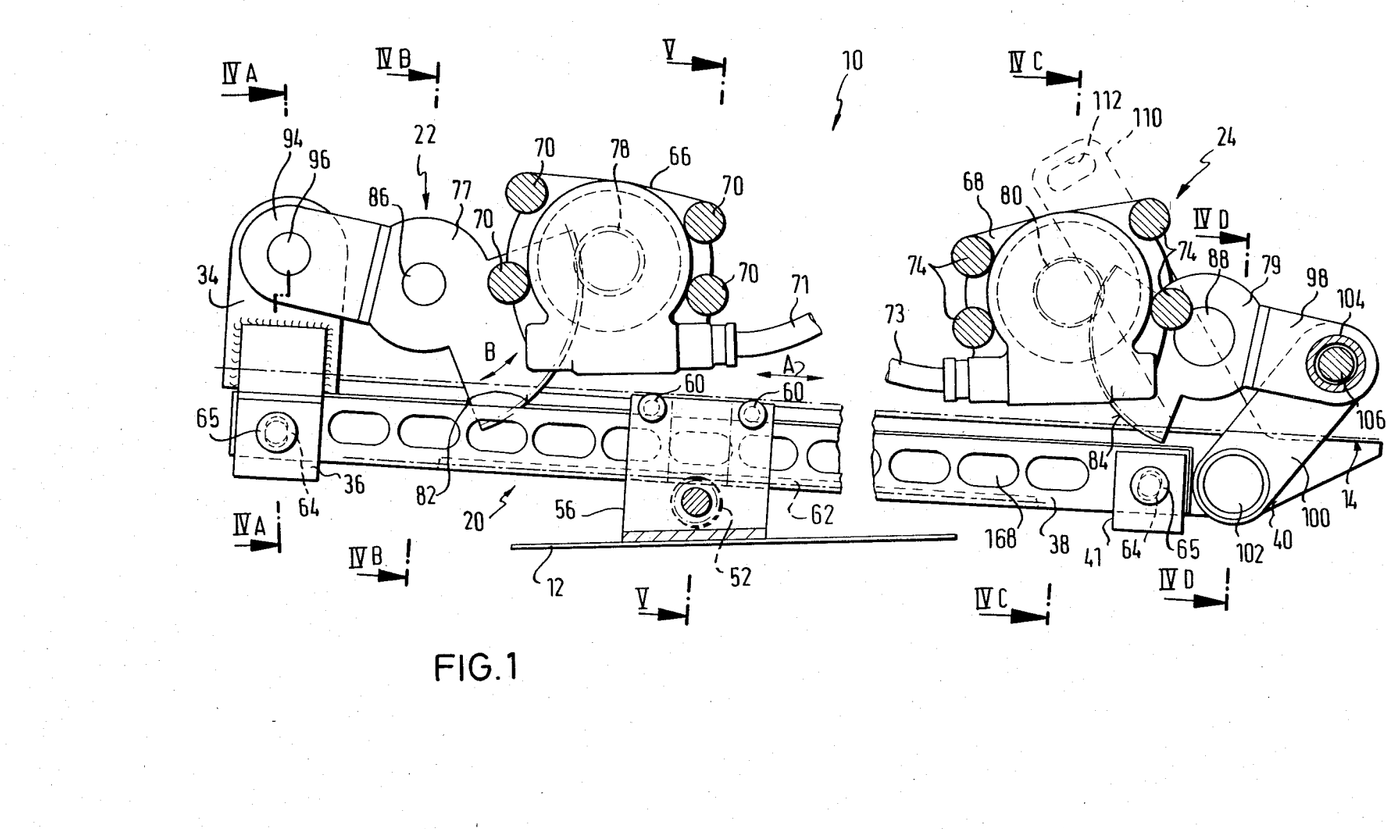
FIG. 1 is a side elevation of an adjustable seat assembly in accordance with the present invention partially in section and taken along the line I—I of FIG. 3.

Referring now to the drawings wherein like parts are identified with similar reference characters throughout the various figures thereof, a seat assembly in accordance with the present invention is designated in its entirety by the reference numeral 10, as shown in FIG. 1. The seat assembly comprises a base portion 12 which is affixed to the floor of a motor vehicle or which may constitute a part of the motor vehicle floor or interior, and a seat portion or seat bucket 14, not shown in its entirety, which is mounted to be movable relative to the base portion 12. In FIGS. 1-3 and 7, the seat bucket 14 is shown in part and, as can be inferred from the sectional views of FIGS. 4 and 5, a box-like sectional member is formed on both longitudinal sides within the seat portion 14 which is formed of a first wall 16 having a generally C-shape and a second wall 18 having an approximately L-shape.

The seat assembly 10 is operative to enable longitudinal adjustment of the seat portion 14 in the direction of the double arrow A as well as tilt and height adjustment of the seat portion 14 relative to the base portion 12. In the embodiment of the invention depicted in the drawings, a longitudinal adjustment device 20 is provided for longitudinal movement of the seat portion 14 and a tilt and height adjustment mechanism is also provided which consists of a front tilt adjusting device 22 and a rear tilt adjusting device 24 whereby height adjustment of the seat bucket 14 may be accomplished at the front and rear ends thereof.

In the embodiment depicted, the longitudinal adjustment device follows the base pan 12 and the tilt adjustment mechanism is attached to the seat bucket 14 and follows the longitudinal adjustment device 20. Of course, the advantages of the invention can also be derived if this arrangement is reversed, that is, if the tilt or height adjustment device, respectively, first follows the base pan, with the longitudinal adjustment device following subsequently as is described, for example, in German Offenlegungsschrift 27 13 693.

The longitudinal adjustment device 20 is formed to comprise on each longitudinal side or sidewall of the seat, a bearing or carrying rail 28 which is formed with an approximately C-shaped cross-section and which is rigidly connected with the base pan 12, for example by means of rivets or bolts 26. An adjusting rail 30 having an approximately T-shaped cross-section is inserted in each of the bearing rails 28 and is supported so as to be longitudinally displaceable in the direction of the arrows A by means of ball bearings 32. On the front end of the adjustment rail 30 (seen at the left in FIG. 1) a bracket or clip 34 of the adjustment rail 30 projects perpendicularly upward and welded to this bracket is a retaining stirrup 36 for a toothed rack 38, with the retaining stirrup in turn projecting downwardly (see FIG. 4A). The toothed rack 38 extends parallel to the rails 28 and 30 and it is, however, somewhat shorter than these rails. The rear end of the toothed rack is supported by a further retaining stirrup 41 which in turn is welded onto a bracket 40 projecting downwardly on the rear end of the adjustment rail 30.

Figure 2:
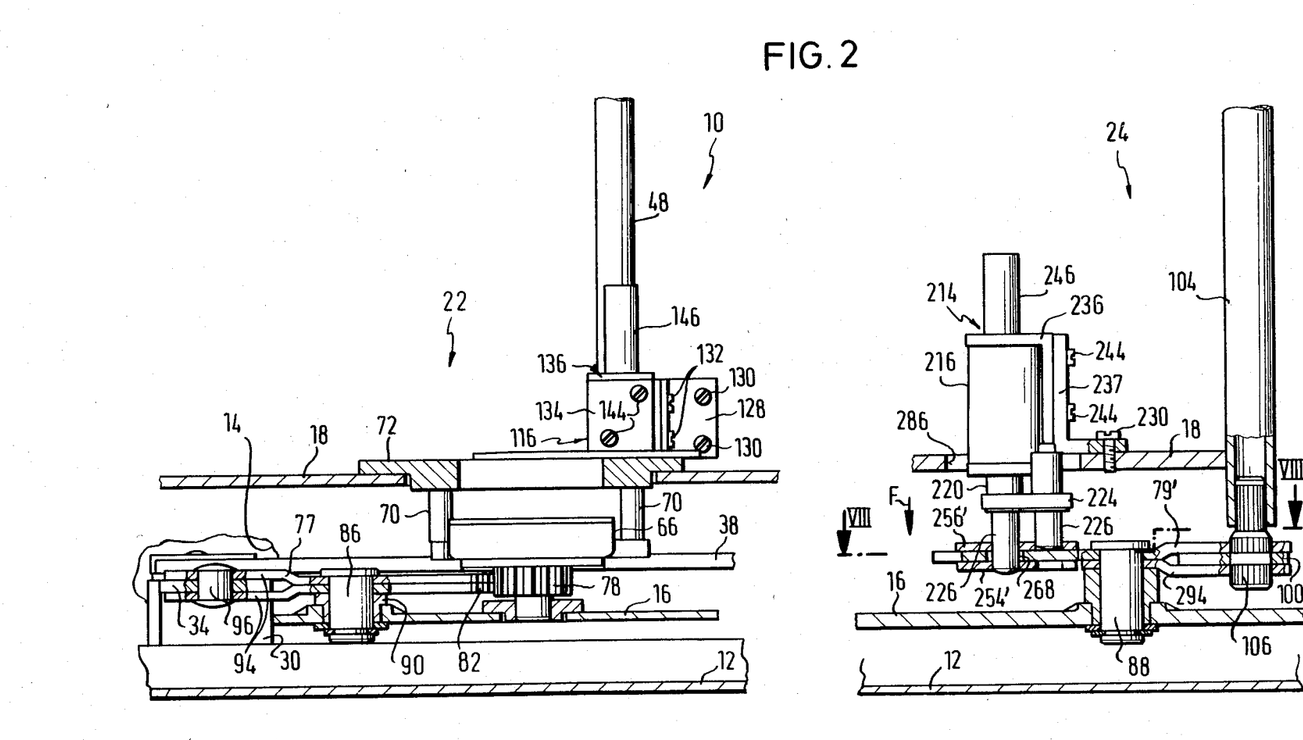
FIG. 2 is a broken top view of the left side, taken with respect to the driving direction, of the seat assembly shown in FIG. 1.

An adjustment motor (not shown) is provided for longitudinal adjustment of the adjustment rail 30 and the adjustment motor operates to engage a gear assembly 43 through a flexible geared shaft 42 shown in FIG. 2, with the gear assembly 43 being rigidly fastened to the base portion 12 by means of, for example, screws 44. Splined drive shafts 46 project from both sides of the gear assembly 43, with each of the drive shafts being nonrotatively connected with a correspondingly splined shaft end 50 of a pinion 52 meshing with one of the toothed racks 38, respectively, through a clutch pipe 48. Additionally, each pinion 52 is arranged between a pair of holding angles 54 and 56 which are arranged on both sides of the toothed racks 38, with a pivot bearing bush 58 for the pinion 52 being inserted in the inner holding angle 56. The two holding angles 54 and 56 are each fastened for example by spot welding at their respective lower ends on the base portion 12. The upper ends of the holding angles 54 and 56 have the toothed rack 38 positioned therebetween and they are rigidly connected with each other directly above the toothed rack 38 by means of a pair of rivets 60 (see FIGS. 1 and 5). The lower longitudinal border of the toothed rack 38 is formed with rack teeth 62 which mesh with the pinion 52. In this manner, the toothed rack 38 is fitted into a guiding space with only limited play or movement, with the guiding space thus being defined toward the top and bottom through the double headed rivets 60 and the pinion 52, respectively, and in the transverse directions of the toothed rack by the upper ends of the holding angles 54 and 56. In this manner, the engagement between the pinion 52 and the rack teeth 62 may be provided free of excessive play.

In order to compensate for manufacturing tolerances, the ends of the toothed rack 38 are formed respectively with an elongated hole 64 which extends crosswise to the longitudinal direction of the toothed rack 38, with the hole 64 having a cylindrical bolt or rivet 65 extending therethrough for connection with the respective holding stirrups 36 and 41.

The longitudinal adjustment device 20 is formed with the same configuration on both sides of the seat assembly. In order to adjust the seat longitudinally in the direction of the double arrow A, the two clutch pipes 48 are simultaneously rotated along with the pinions 52 which displace the two toothed racks 38 in the desired manner thereby displacing as well the respective adjustment rails 30.

The seat portion 14 is connected with the adjustment rail 30 through the two tilt adjustment devices 22 and 24. Each tilt adjustment device 22, 24 consists of an adjustment gear assembly 66 and 68, respectively, each of which is connected with a corresponding adjustment motor (not shown) through a flexible connection shaft 71, 73 shown in FIG. 1. As may be inferred especially from FIGS. 4A-4C, the adjustment gear assemblies 66, 68 are each arranged in the interior of the seat portion 14 specifically between the walls 16 and 18 thereof. Gear assembly 66 is rigidly fastened on a retaining plate 72 by means of four spacer bolts 70, with the retaining plate 72 being in turn attached to the wall 18. The gear assembly 68 is accordingly also fastened on the wall 18 by means of spacer bolts 74 and a retaining plate 76.

Figure 3:
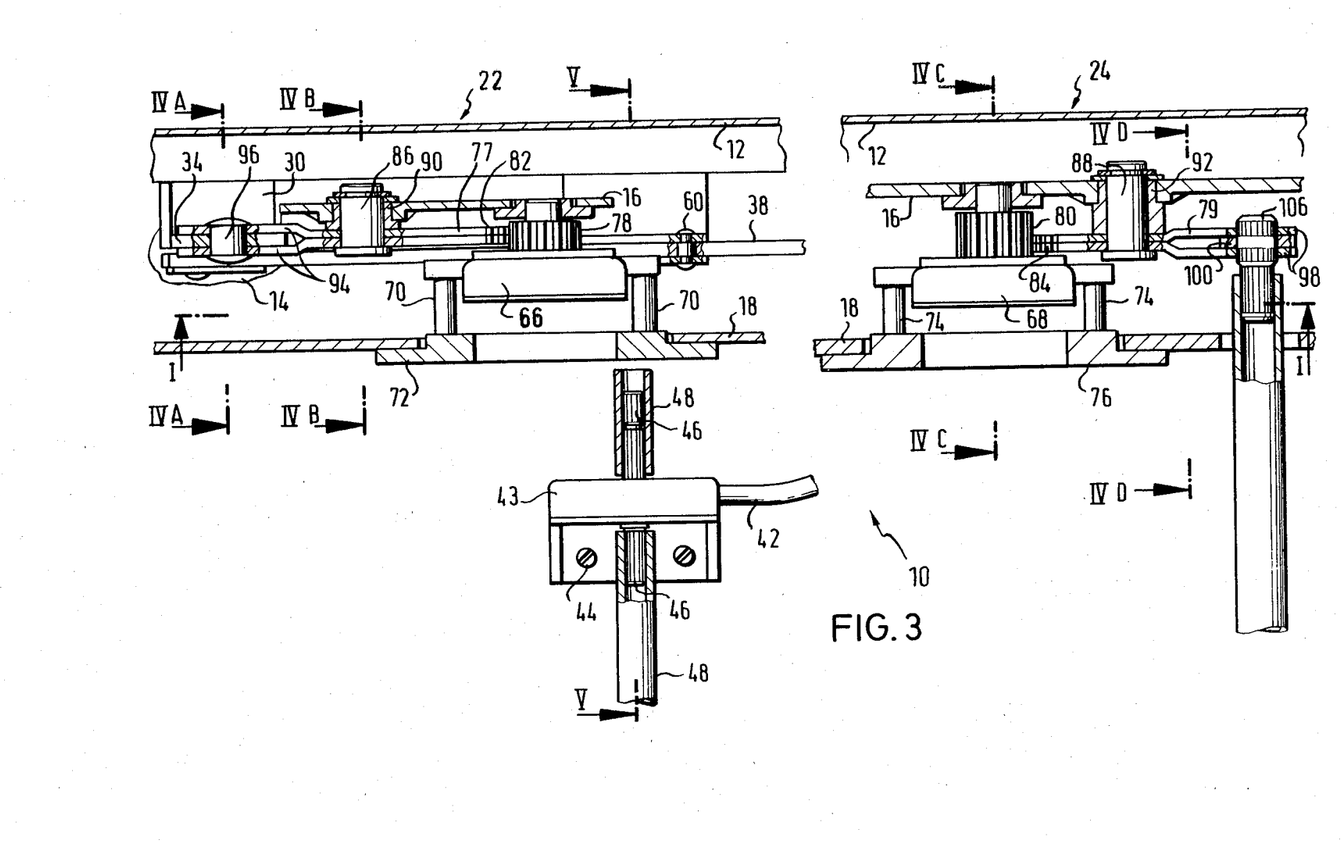
FIG. 3 is a broken top view of the right side of the seat assembly of FIG. 1.
Figure 4A:
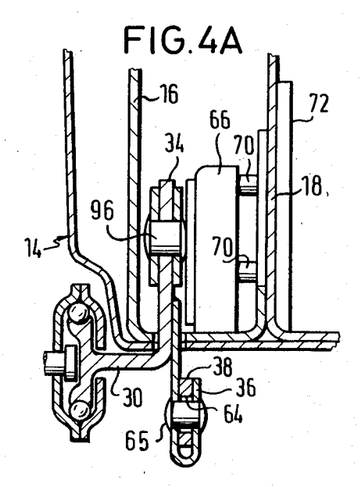
FIGS. 4A–4D are partial sectional views showing the seat assembly of FIGS. 1–3 in greater detail, with FIG. 4A being a sectional view taken along the line IVA—IVA of FIGS. 1 and 3, with FIG. 4B being a sectional view taken along the line IVB—IVB of FIGS. 1 and 3, with FIG. 4C being a sectional view taken along the line IVC—IVC of FIGS. 1 and 3, and with FIG. 4D being a sectional view taken along the line IVD—IVD of FIGS. 1 and 3.
Figure 4B:
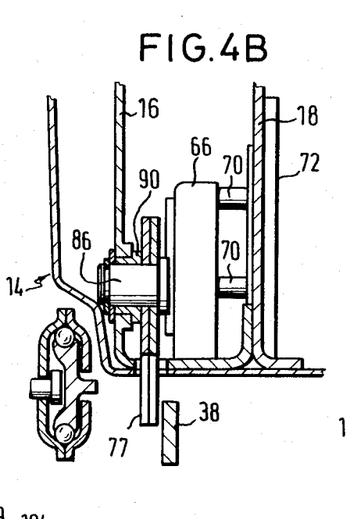
Figure 4C:
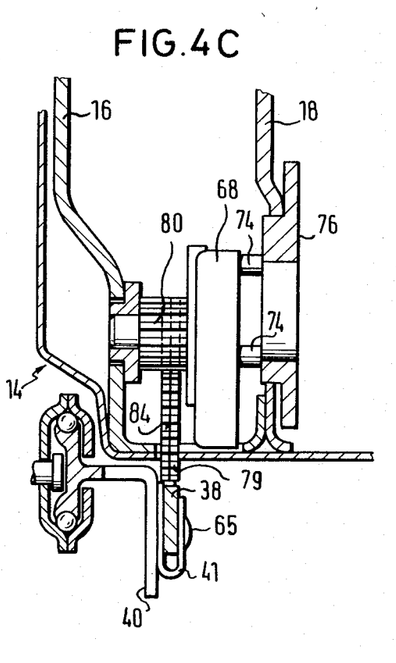
Figure 4D:
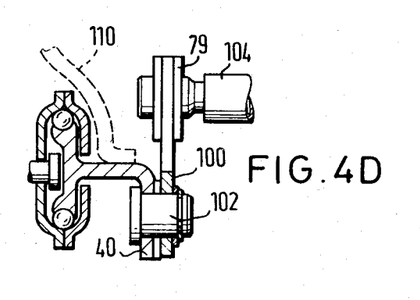

Each gear assembly 66 and 68 drives a twin armed lever 77 and 79, respectively, by means of a toothed wheel 78 and 80, respectively, as seen in FIGS. 1 and 3, with the wheels 78 and 80 engaging, respectively, a toothed sector 82 and 84 of the respective twin armed levers 77 and 79. Each of the twin armed levers 77 and 79 is rotatively supported on a wall 16 by a bearing bolt 86 and 88 which in turn is inserted in a bearing sleeve 90, 92 in the wall 16.

The forwardmost twin armed lever 77 upon which there is formed the toothed sector 82 is linked on its opposite side through the arms 94 onto the bracket 34 by means of a pivot bolt 96. In this arrangement, the twin armed lever 77 has its twin arms lying on opposite sides of the bracket 34 in a bifurcated manner. As is shown in FIG. 2, the part of the forward tilt adjustment device 22 formed on the left side of the seat is arranged exactly like the part on the right side described above. During simultaneous actuation of the adjustment motors assigned to the two adjustment gear assemblies 66, the front border of the seat is thereby raised or lowered accordingly.

The construction of the rear tilt adjustment device 24 corresponds substantially to that of the front seat adjustment device 22 with the exception that the twin armed lever 79 and its arm 98 which lies opposite to the toothed sector 84 is not directly linked with the adjustment rail 30, but to one end of a clutch bracket 100 with the other end of the clutch bracket 100 being connected so as to swivel with the adjustment rail 30 by means of a pivot bolt 102 passing through the bracket 40. Thus, the seat is supported on the adjustment rail 30 through or by means of the front twin armed lever 77 and through or by means of the rear twin armed lever 79 with the intermediary of the clutch bracket 100. The clutch bracket 100 in addition enables a free angle and height adjustment of the seat relative to the adjustment rail 30.

In order to reduce expenses of the adjustment gear assembly and in order to, optionally, eliminate the need for an adjustment motor with respect to the rear tilt adjustment device 24, a twin armed lever 79' shown in FIG. 2 and provided on the right side of the seat member is nonrotatably connected to the twin armed lever 79 on the left side by means of a clutch pipe 104. Moreover, a splined clutch bolt 106 is inserted in each end of the pipe, with the splined clutch bolt 106 passing through both parts of the respective twin armed levers 79 and 79' crosswise and engaging these parts in corresponding splined receiving openings. The respective clutch bolt 106 is formed with a smooth circumferential surface in the area thereon located between the bifurcated parts of the twin armed lever in order to form a pivot bearing for the respective clutch bracket 100.

Usually a safety belt for a vehicle seat will be directly fastened on the body. Thus, in the case of a three point safety belt, the shoulder belt ends will be fastened on the B-column and the ends of the waist belt on both side of the seat will be fastened on the motor vehicle floor. When the seat is adjusted, the position of the belt fastening points will change relative to the seat or relative to the person located on the seat. This is detrimental both to safety and to fastening comfort. Should the safety belt be fastened on the motor vehicle seat itself, on the other hand, then the problem arises that the seat adjustment must now withstand very great forces which may amount to as much as 18,000 N per belt fastening point. In the seat adjustment device 10 described above, the ends of the waist belt are attached to the adjustment rail 30, for example with each of these ends being connected over a belt bracket which is welded onto the rear end of the adjustment rails 30. The belt bracket is indicated in FIG. 1 and in FIG. 4D in broken line form by the reference numeral 110. FIG. 1 shows a belt eyelet 112 on the free end of the belt bracket 110. The belt bracket 110 therefore follows all longitudinal adjustment moves of the seat portion. Relative to a fastening of the ends of the waist belt directly on the seat bucket 14, the advantage results that in an accident only the longitudinal adjustment device 20 must absorb the belt forces and not the tilt adjustment devices 22 and 24.

In order to avoid transfer of belt forces to the pinions 52 as well as to the adjustment gear assembly 43 connected in the power train therewith to the connected adjustment motor, and since these belt forces if applied could lead to possible damage of the parts, a pin locking mechanism 114 is provided on the seat adjustment mechanism 10 on the left side of the seat. The pin locking mechanism 114 is operable to be engaged so as to block the movement of the left toothed rack 38 when the adjustment motor is not in operation and thereby to conduct the belt forces introduced through the belt bracket 110, the left adjustment rail 30 and the retaining stirrups 36 and 41 in the left toothed rack 38 directly into the base portion 12 of the seat assembly and therethrough to the vehicle floor.

Figures 5, 6:
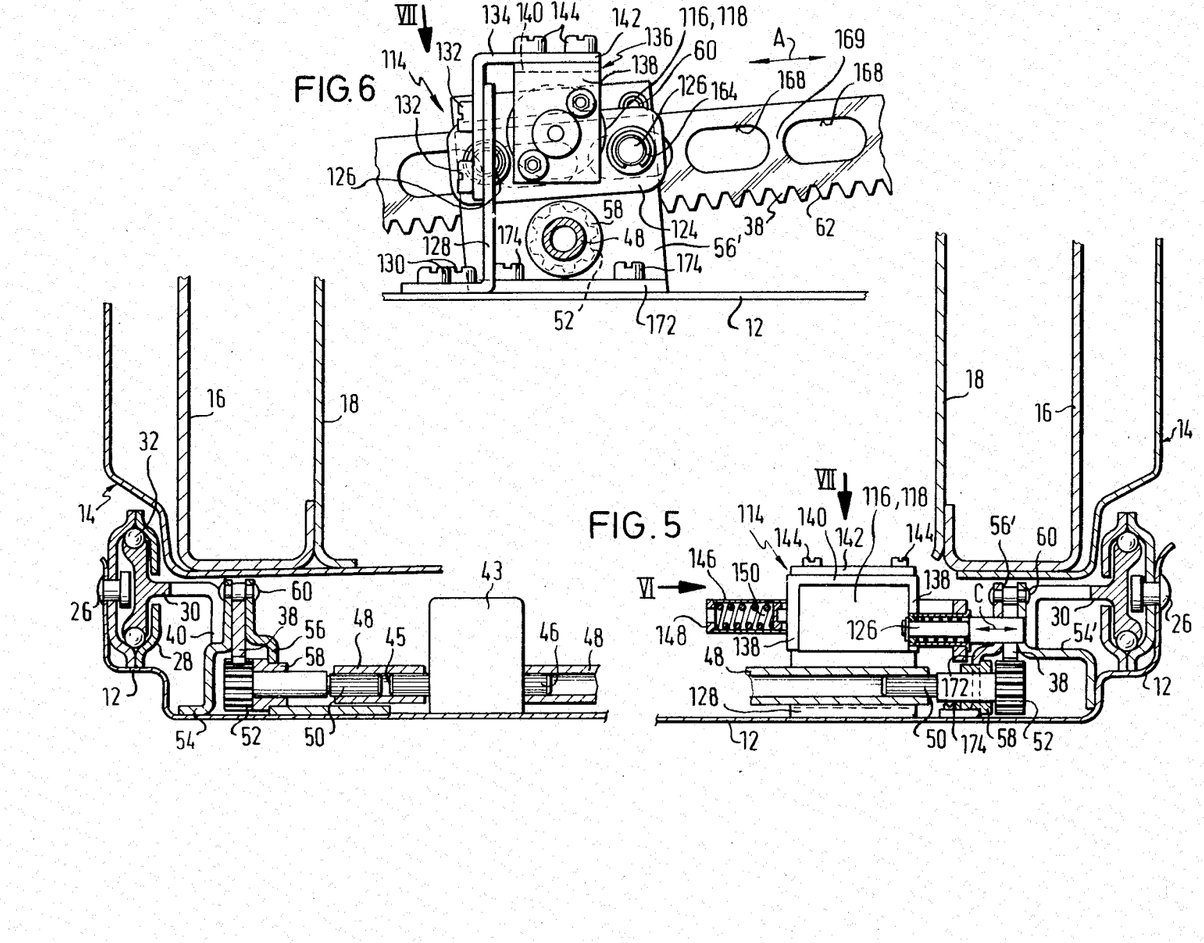
FIG. 5 is a broken cross-sectional view showing the width of the seat assembly and taken along the line V—V shown in FIGS. 1 and 3.
FIG. 6 is a partial side view showing parts of the assembly as viewed in the direction of the arrow VI shown in FIG. 5.

In most cases, it is sufficient to provide a pin locking mechanism only on one side of the seat assembly since both pinions 52 are nonrotatively connected with each other by means of the clutch pipe 48 and drive shaft 45 of the gear assembly 43 which extends therethrough and the right pinion 52 on the right in FIG. 1 is blocked from the start as a result of the blocking of the toothed rack 38 on the right in FIG. 5 through pin locking mechanism 114.

Pin locking mechanism 114 is composed of an electromagnetic 116 having a cylindrical magnetic housing 118 which is stationary and with a magnetic armature 120 which is reciprocally movable in a horizontal direction C extending perpendicularly to the longitudinal adjustment direction A. An elongated pin carrier 124 extending crosswise relative to the pins is fastened approximately on the center of the magnetic armature 120 by means of a nut 122, and the pin carrier 124 in turn carries a pair of pins 126 which extend parallel to the direction C.

The cylindrical magnet housing 118 is rigidly connected with the base portion 12 by means of several stirrups, that is, through an L-shaped angle 128 screwed by means of screws 130 onto the base portion 12. The angle plate 128, as best seen in FIG. 6, is connected with a second L-shaped angle plate 134 by means of screws 132, with the angle plate 134 being connected with a U-shaped stirrup 136 whose side piece 138 which extends downward vertically encompasses both end faces of the cylindrical electromagnet 116 and whose upper middle piece or bight 140 is screwed by means of screws 144 on the horizontal side 142 of the second angle plate 134.

The magnetic housing 118 extends on the side thereof remote from the pin carrier 124 into a sleeve 146 with a reduced diameter, with the free end of the sleeve being closed by a plug 148. A helical pressure spring 150 is arranged in the interior of the sleeve 146 and the pressure spring 150 is supported on one side by the plug 148 and on the other side by the left end of the magnetic armature 120 which is provided at its left end with a piston 152 located within the sleeve 146 which directly engages the spring 150. The pressure spring 150 prestresses the magnetic armature 120 toward the right as seen in FIGS. 7A and 7B, that is, toward the toothed rack 38.

Each of the pins 126 is supported within a bearing sleeve 154 so as to be displaceable in direction C. The right end (as seen in FIGS. 7A-B) of the bearing sleeves 154 is formed with a collar having an enlarged diameter which abuts on the right side face 156 of the pin carrier 124. A bearing ring 158 is inserted into the left end of the bearing sleeve 126 with the bearing ring 158 forming a linear bearing for the pin 126. An annular space 160 is formed between the inner circumferential surface of the bearing sleeve and the pin 126, with the annular space 160 being defined in an axial direction on the one side by bearing ring 158 and on the other side by an enlarged diameter collar 163 of the pin 126. The diameter of the collar 163 is adapted to the inner diameter of the sleeve 154. A helical prestressing spring 162 is inserted in the intermediate space 160, with the spring 162 prestressing the respective pin 126 toward the right, i.e., against the toothed rack 38.

Figure 7A:
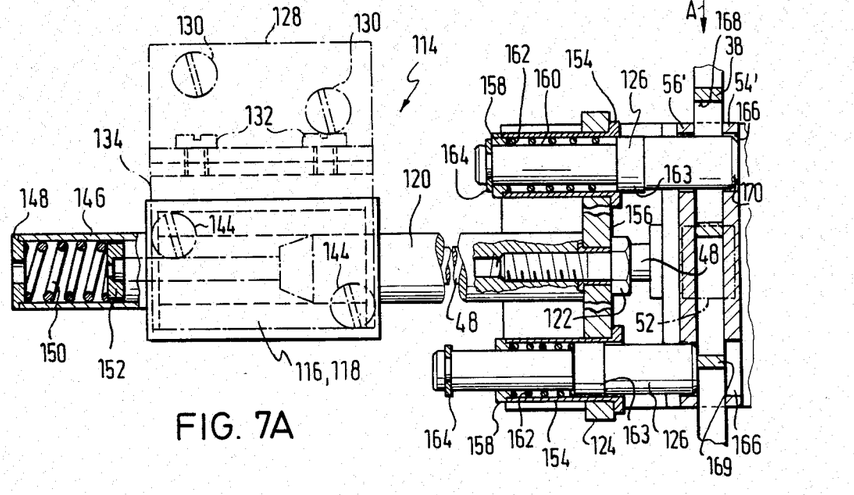
FIGS. 7A and 7B are top views showing parts of the locking pin mechanism of the invention as viewed in the direction of the arrow VII shown in FIG. 5, with FIG. 7A showing the locking position, and with FIG. 7B showing the unlocked or disengaged position.
Figure 7B:
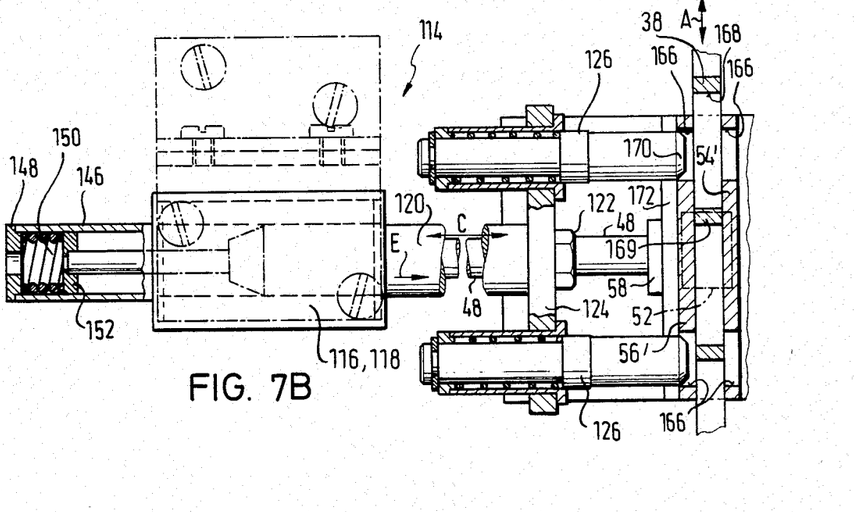

A snap ring 164 is attached to the left end of the pins 126 in order to secure the pin 126 in the sleeve 154 and thereby fix or define the end position of the pin 26 and its maximum extension toward the right as seen in FIGS. 7A–B.

As seen in FIGS. 5, 7A, and 7B, the holding angles 54' and 56' which correspond to holding angles 54 and 56 on the left side in FIG. 5 are each provided with a pair of holes 166 which are adapted in diameter and positioned relative to the pins 126 so that the pins 126 can move into the holes 166 as long as the toothed rack 38 lying between the angles 54' and 56' is not positioned to prevent such movement. The upper pin 126 as shown in FIG. 7A has moved precisely into the hole 166 since the toothed rack 38 is formed in this area with a recess 168 arranged to permit movement of the pin 126. In order to facilitate the insertion or movement of the pin 126, the right end of the pin 126 is formed with a bevel 170.

As will be seen from the drawings, the axis of the magnetic armature 120 is arranged above the axis of the clutch pipe 48, as best seen in FIG. 5. In FIGS. 7A–B, the pinion 52 is indicated in broken line form. Moreover, a bent edge 172 of the holding angle 56' is fastened by screws 174 with the base portion 12. Additionally, it will be seen that the pivot bearing sleeve 58 for clutch pipe 48 is inserted in the holding angle 56' and the holding angles 54' and 56' are attached to one another in turn by means of double-headed rivets 60.

The dimensions as well as the arrangement of the pins 126 are so adapted to the dimensions and arrangement of the recesses 168 of the toothed rack 38 such that at least one of the two pins 126 will always engage in one of the recesses 168 in all possible longitudinal adjustment positions of the toothed rack 38.

Figure 11:
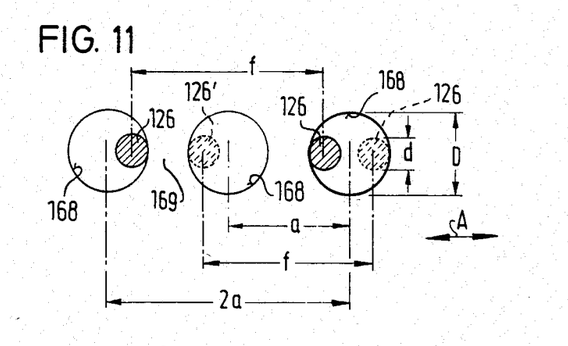
FIG. 11 is a schematic diagram showing locking pins and pin recesses and depicting the basis for calculating the dimensions of the parts thereof.

The parameters which affect the dimensioning of the various parts, particularly the dimensioning and spacing of the pins 126 and the recesses 168, are shown schematically in FIG. 11. As indicated in FIG. 11, three recesses 168 are shown adjacent each other in alignment and the distance between the middle points of adjacent recesses 168 is designated as a, with the width of each recess 168 measured in the direction A being designated D. Since in the arrangement shown in FIG. 11 the recesses are circular in form, the dimension D is also the diameter of a circle and is therefore equivalent in the direction A as well as in the direction indicated in FIG. 11 for the dimension D. An initial or starting position of the pins 126 is depicted in solid line form in FIG. 11. The distance between the midpoints of the pins 126 is taken as f and the width of the pins is taken in direction A and identified as the pin diameter d. From their initial positions shown in FIG. 11, the pins 126 are moved toward the right (the toothed rack with the recesses 168 being relatively moved toward the left) until the position of the pins 126 designated in dotted line form is reached. In this position, the leftmost pin 126' will exactly reach into the center recess 168. Since the leftmost pin between these positions runs along the web 169 located between the two adjacent recesses 168, the mechanism must be dimensioned to ensure that during this time the rightmost pin will always be in a position so that it may move into a recess 168. This is ensured through the arrangement shown since between the two positions, the rightmost pin 126 will always be capable of moving into the recess 168 which is furthest to the right of the three recesses shown in FIG. 11. In its initial position, the rightmost pin will be located on the left border of the corresponding recess 168 and in the position indicated in dotted line form on the rightmost border.

Thus, during the time that the leftmost pin 126 moves across the web 169, the rightmost pin 126 will be moving across the rightmost recess 168.

Based upon the foregoing operating parameters, the following relationships can be derived from the sketch of FIG. 11:

$$a = f + d - D$$

$$2a = f - d + D.$$

From these equations, the following may be derived:

$$D = \frac{f}{3} + d \text{ and}$$

$$a = \frac{2}{3} \times f.$$

When f=36 mm and d=9 mm, the result is D=21 mm as well as a=24 mm.

In order to bring the locking device 114 into its locked position, it is necessary to turn off the retaining or holding current which holds the magnetic armature 120 in its disengaged position in accordance with FIG. 7B against the force of the spring 150. Upon cessation of current, the magnetic armature 120 is displaced to the right by the force of the spring 150 acting in the direction E.

At least one of the two pins 126 will be located within a recess 168 and will extend therethrough. The pin will then extend into the circular opening 166 of the outer holding angle 54'. In the example shown in FIG. 7A, the lower of the two pins 126 encounters the web 169 between the recesses 168. Since pin 126 is displaceably supported in the pin carrier 124 against spring force, the pin carrier 124 may move forwardly farther in the direction E despite the fact that the lower pin 126 is stopped until the upper pin 126, as shown, has penetrated the circular opening 166 of the holding angle 54'. However, the force of the increasingly pressed together lower prestressing spring 162, while acting in the opposite direction to the movement described above, is substantially smaller than the prestressing force of the more powerfully dimensioned helical pressure spring 150 on the other end of the magnetic armature 120 so that, for this reason as well, the pin locking mechanism 114 is not prevented from switching over into its locking position as shown in FIG. 7A. In this locking position, the pulling or pushing forces engaging the toothed rack 38 are conducted in the direction A directly into the base portion 12 of the motor vehicle through the respective meshed pins 126 and holding angles 54' and 56' which hold these pins with their openings 166. The locking engagement is also ensured during termination of power supply since, as already mentioned above, the pin locking device 114 assumes its locking position in accordance with FIG. 7A when the electromagnets 116 are switched off.

In order to prevent the pinion 52 from rotating during blocking engagement of the pin locking mechanism 114 when adjustment operation of the longitudinal adjusting device 20 is actuated, a delay circuit (not shown) is provided which first applies a holding current to the electromagnets 116 at the beginning of the actuation of the longitudinal adjusting device and only then drives the corresponding adjusting motor with delay while turning off the retaining current with delay after the adjusting motor is turned off.

When the upper end of the shoulder belt is fastened on the seat back of the motor vehicle seat assembly, substantial torque will occur which will be transmitted through a correspondingly stable or solidly dimensioned seat back joint (not shown) to the seat part 14 and from there through the tilt adjusting devices 22 and 24 to the longitudinal adjusting device 20 and finally to the base portion 12. The longitudinal adjusting device 20 is sufficiently stable relative to such pitching or tilting moments. The forces acting on the front tilt adjusting device 22 are relatively small so that generally no additional measures are necessary to ensure that the front tilt adjusting device 22 is not shifted out of place or even damaged during application of such a load or stress. The self-locking of the driving part composed of the adjustment gear assembly 66, flexible gear assembly shaft 71, and the assigned adjustment motor on both sides of the seat assembly is sufficient to prevent automatic or self-actuating adjustment. In the rear tilt adjustment device 24, a drive, including adjustment gear assembly 68, gear assembly shaft 73, and the assigned adjustable motor, is formed only on one side so as to be self-locking. Since, however, relatively high incidental forces are to be absorbed in this area, an additional pin locking mechanism is provided on the left side (FIG. 2) of the tilt adjusting device 24, which pin locking mechanism is designated by reference numeral 214. This mechanism has the same construction as the pin locking mechanism 114, with the parts of the mechanism 214 being therefore provided with similar reference numerals as those used to identify the parts of the pin locking mechanism 114, each increased by a factor of 100.

Accordingly, the pin locking mechanism 214 is similarly composed of an electromagnet 216 encircled by a U-shaped stirrup 236 which is in this case arranged to lie in a horizontal plane. The pin locking mechanism 214, which operates to lock the twin armed lever 79' attached to the seat portion 14 is therefore also connected with the seat portion 14. Additionally, one side of an L-shaped angle plate 237 is firmly attached by screws 244 on the stirrup 236 and its other side is attached by screw 230 on the wall 18. Additionally, pin locking mechanism 214 passes through an opening 286 in the wall 18.

Figures 8, 9:
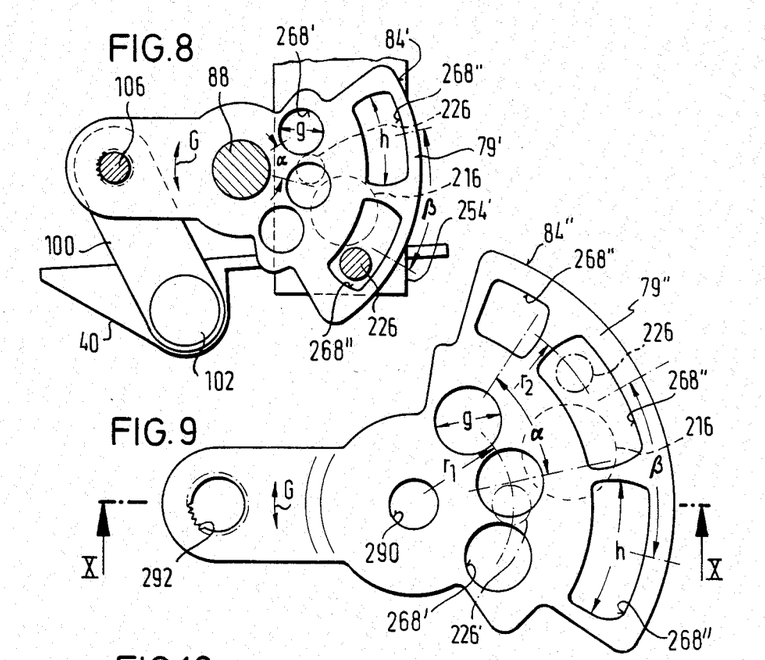
FIG. 8 is a partial sectional view taken along the line VIII—VIII of FIG. 2.
FIG. 9 is a view of a twin armed lever of a further embodiment of the invention depicted in a view similar to that of FIG. 8.

Accordingly, holding angles 254' and 256' which correspond to holding angles 54' and 56' are rigidly fastened (in a manner not shown) on the seat part 14, for example on the wall 18. The holding angle 254' remote from the pin locking mechanism 214 is indicated in FIG. 8. It can also be seen from FIG. 8 that pin locking mechanism 214 is turned relative to pin locking mechanism 114 along its longitudinal axis in such a manner that one of the pins 226 thereof is arranged at the upper left and the other pin 226 is arranged at the lower right, with reference to the electromagnet 216, designated in broken line form in FIG. 8.

The pin locking mechanism 214 shown in FIGS. 2 and 8 is in its locking position wherein magnetic armature 220 along with pin carrier 224 is pressed in the direction of an arrow F by the spring pressure of a helical spring (not shown) arranged in sleeve 246 until one of the pins 226 (the pin radially remote from the pivot bearing bolt 88) is finally moved into a recess 268" of the twin armed lever 79'.

As indicated in FIG. 8, the part of the twin armed lever 79' corresponding to the toothed sector 84 of the twin armed lever 79 which lies opposite thereto is likewise formed as a circular sector although without peripheral teeth. This circular sector is designated 84' and whereas the toothed rack 38 is formed with a single linear row of recesses 168, the circular sector 84' is provided with two rows of recesses, i.e., the first recesses 268' arranged in an arc of small diameter concentric to the axis of the bolt 88 and recesses 268" on a corresponding arc of greater diameter. This provides an especially compact arrangement of recesses wherein the result is again achieved that in all possible rotating positions of the elements, rotation being taken in the direction of the double arrow G, at least one of the pins 226 will engage a recess 268' and 268", respectively, of the rows of recesses assigned to this pin.

This condition will be fulfilled if, for example, with an unchanged pin diameter d of 9 mm and a pin distance f of 36 mm, the diameter g of the inner circular recesses 268' equals 16 mm with an angle α between the centers of neighboring recesses 268' being approximately 42°. The length h of the elongated arc-shaped curved outer recesses 268' amounts to approximately 32 mm, and the angle β between the centers of neighboring recesses 268" amounts to approximately 43°.

Figure 10:
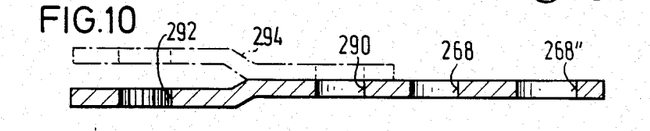
FIG. 10 is a sectional view of the twin armed lever of FIG. 9 taken along the line X—X.

FIGS. 9 and 10 depict a twin armed lever 79" which comprises an alternative structure differing from the twin armed lever shown in FIG. 8 in that, instead of two outer recesses 268" being provided as indicated in FIG. 8, there are provided three such recesses 268". Moreover, the corresponding pin locking mechanism 214 is differently oriented so that one of the pins 226 is arranged at the upper right and the other is arranged at the lower left with respect to electromagnet 216. A greater possible pivoting angle in the direction G of the twin armed lever 79" is achieved through this arrangement. Moreover, the number of inner circular recesses 268' is three. Finally, in FIG. 10 a bearing opening 290 for the pivot bolt 88 is provided and a splined opening 292 for a nonrotative connection with clutch pipe 104 by means of clutch bolt 106 (FIG. 2) is also indicated. Additionally, in FIG. 10, there is provided a reinforcing bracket 294 which is indicated in broken line form in a manner similar to that for the twin armed lever 79' according to FIG. 2. The end of the double armed lever 79', 79" remote from a sector circle 84', 84" together with reinforcing bracket 294 encloses the clutch bracket 100 in a bifurcated manner.

Like the pin locking mechanism 114, the pin locking mechanism 214 is also always held in its blocking state when the rear tilt adjustment device 24 is not actuated. A delay circuit is similarly provided which ensures that the corresponding adjustment motor is started only when the pin locking mechanism ceases to be located in its blocking position. Pin locking mechanism 214 is brought into its blocking state only after the tilt adjustment device 24 ceases to move after switching off of the retaining current.

The pin locking mechanism 214 may generally be put to use for any given swiveling part of the seat assembly in order to block such swiveling part and thereby continue to conduct high forces without problems. Such a pin locking mechanism may optionally be used on all four twin armed levers 77, 79, 79' of the seat assembly 10. A pin locking mechanism 114 may also be mounted on each of the two pinions 52 of the longitudinal adjustment device 20. Instead of fastening the waist seat belt ends on adjustment rails 30, other fastening points may also be selected, for example, on the seat portion 14. Additionally, the pin locking mechanisms may also be used advantageously if, as mentioned above, the longitudinal adjustment device 20 lies above the tilt adjustments devices 22 and 24.

Finally, the joinder between the rear seat back and the seat portion may also be secured through a pin locking mechanism similar to the pin locking mechanism 214.

With respect to the twin armed lever 79" formed in accordance with FIGS. 9 and 10, it must be also indicated that here the angle $\alpha$ amounts to approximately 44° and the angle $\beta$ amounts to approximately 41°, with the diameter g being about 16 mm and the length h being about 34 mm. Recesses 268' lie on an arc having a radius $r_1$ equal to 50 mm and recesses 268" lie on an arc having a radius $r_2$ equal to 104 mm.

Thus, from the foregoing, it will be seen that the present invention provides a seat assembly having seat adjustment means particularly suitable for use in a motor vehicle seat having a longitudinal adjustment device including the toothed rack 38 and the pinion 52 and with an optional tilt or height adjustment device wherein the longitudinal adjustment device as well as the optional tilt or height adjustment device may be formed so as to become locked by means of at least one pin locking mechanism such as the locking mechanism 114. The seat adjustment mechanism may then be exposed to relatively high forces so that a safety belt may be directly fastened on the seat portion of the assembly or upon parts of the seat adjustment mechanism. Two locking pins 126 are provided of which at least one will always be capable of engagement so as to block movement of the appropriate parts of the mechanism, for example, in a recess 168 of the toothed rack 38 in any adjustment position of the rack.

While a specific embodiment of the invention has been shown and described in detail to illustrate the application of the inventive principles, it will be understood that the invention may be embodied otherwise without departing from such principles.

What is claimed is:

1. A seat assembly particularly for a motor vehicle including a vehicle frame and a vehicle seat comprising longitudinal seat adjustment means for adjustably moving said seat in longitudinal directions relative to said vehicle, tilt adjusting means for effecting height adjustment of said vehicle seat, and pin locking means operatively interposed between said vehicle frame and at least one of said longitudinal seat adjustment means and said tilt adjustment means capable of being selectively actuated to a locking position for locking said at least one of said longitudinal seat adjustment means and said tilt adjustment means, said longitudinal seat adjustment means comprising a longitudinally movable part having pin recesses therein, said pin locking means including a plurality of pins arranged adjacent each other in the direction of movement of said moving part, said recesses having a width taken in said direction of movement which is equal to the sum of the respective width of two of said pins and one-third of the distance between the axial centers of said pins, the distance between the centers of adjacent recesses being equal to two-thirds of the distance between the pin axes.

2. An assembly according to claim 1 wherein said pin locking means is electromagnetically actuated, said pin locking means being in the locking position when no electrical current is applied thereto.

3. An assembly according to claim 2 wherein adjustment of said vehicle seat is effected by means of electrical motors, said system further comprising delay circuit means operating to ensure that said electrical motors are actuated only after said pin locking means have been taken out of locking position, and to ensure that said pin locking means are moved to said locking position only after said electrical motors are stopped.

4. An assembly according to claim 1 wherein said moving part of said longitudinal seat adjustment means wherein said recesses are provided is a toothed rack.

5. An assembly according to claim 1 wherein said pin locking means include locking pin means and pin recesses formed in a part of said tilt adjusting means, said part of said tilt adjusting means containing said pin recesses being a part which swivels relative to said pin locking means and which is arranged with said pin recesses located on concentric arcs corresponding to said locking pins.

6. An assembly according to claim 5 wherein said swiveled part of said tilt adjusting means comprises a twin armed swiveling lever which is nonrotatively joined with a second twin armed swiveling lever provided with a pinion-driven toothed sector, said recesses being provided in one arm of said twin armed swiveling lever.

7. An assembly according to claim 1 wherein said pin locking means comprise an electromagnetically actuated pin locking mechanism including a magnetic armature which is electromagnetically moved out of said locking position and spring means for biasing said magnetic armature toward said locking position.

8. An assembly according to claim 7 wherein said pin locking means include a plurality of locking pins each supported so as to be individually displaceable in the direction of locking movement of said pin locking means, said pins being mounted on a common pin carrier and being movable relative thereto with said common pin carrier being connected with said magnetic armature.

9. An assembly according to claim 8 wherein said locking pins are arranged in a bearing sleeve which is attached to said pin carrier, with a prestressing spring being arranged in said bearing sleeve, said prestressing spring being supported on one side on an enlarged diameter collar of said pins and on the other side on a bearing ring on one end of said bearing sleeve.

10. An assembly according to claim 1 further including safety belt means and means for enabling said safety belt means to be attached to parts of said seat assembly which are movable relative to said motor vehicle.

11. An assembly according to claim 10 wherein said tilt adjusting means is arranged between said longitudinal seat adjustment means and said vehicle seat and wherein said safety belt means include at least one safety belt fastening point which is provided upon an upper rail of said longitudinal seat adjustment means, said pin locking means being attached to said vehicle frame of said motor vehicle and engaging in a toothed rack fastened on said upper rail.

12. An assembly according to claim 10 wherein said longitudinal seat adjustment means if arranged between said tilt adjusting means and said vehicle seat and wherein at least one fastening point of said safety belt means is attached on said vehicle seat.

13. An assembly according to claim 10, 11, or 12 wherein said safety belt means further include shoulder belt means fastened on a seat back of said seat assembly.

14. A seat assembly particularly for a motor vehicle including a vehicle seat comprising:

seat adjustment means for adjustably moving said seat relative to said vehicle by displacing a first part of said seat adjustment means connected to said seat relative to a second part of said seat adjustment means connected to said vehicle;

pin locking means capable of being selectively actuated to a locking position for locking movement of said first part relative to said second part, said pin locking means comprising a plurality of pin recesses provided on one of said first and second parts and a plurality of locking pins mounted on the other of said first and second parts;

each of said pins being individually movable in a locking direction orthogonal to the direction of relative movement between said first and second parts between a retracted position without engaging any of said recesses and an engagement position in engagement with one of said recesses;

whereby in said engagement position of any of said pins relative movement of said two parts is blocked and wherein the distances between said locking pins and between said pin recesses are matched in such a manner that in any possible continuous relative position of said two parts at least one of said locking pins faces one of said recesses and therefore is movable into its engagement position so as to block relative movement of said two parts;

said plurality of pins being mounted on a common pin carrier mounted to said one of said first and second parts, each of said pins being individually displaceable relative to said common pin carrier in the locking direction, said pins being provided each with a prestressing spring for prestressing said pins relative to said common pin carrier in the direction toward said other part, said common pin carrier being connected to a magnetic armature for moving said common pin carrier in the locking direction between a first end position and a second end position wherein in said first end position all of said pins are in their retracted position and wherein in said second end position said at least one pin facing one of said recesses is moved in its engagement position whereas the other pins contact the other part each in a region between said recesses under the prestressing form of said prestressing spring.

* * * * *